(No Model.) 2 Sheets—Sheet 1.

W. QUILLEN & F. A. DAKE.
CORN PLOW.

No. 400,710. Patented Apr. 2, 1889.

WITNESSES:
Fred G. Dieterich
Edw. W. Byrn

INVENTOR,
Wm. Quillen
Francis A. Dake
BY
Munn & Co
ATTORNEYS.

N. PETERS, Photo-Lithographer, Washington, D. C.

(No Model.) 2 Sheets—Sheet 2.
W. QUILLEN & F. A. DAKE.
CORN PLOW.
No. 400,710. Patented Apr. 2, 1889.
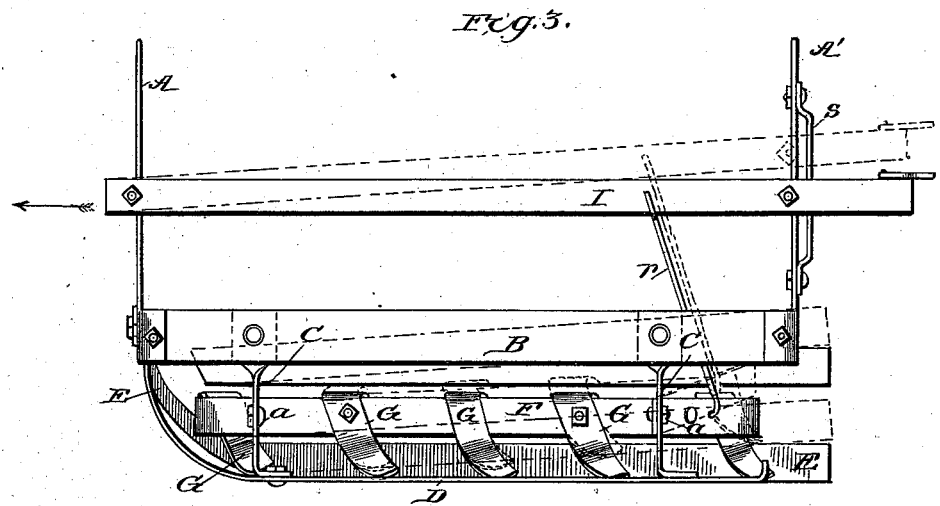
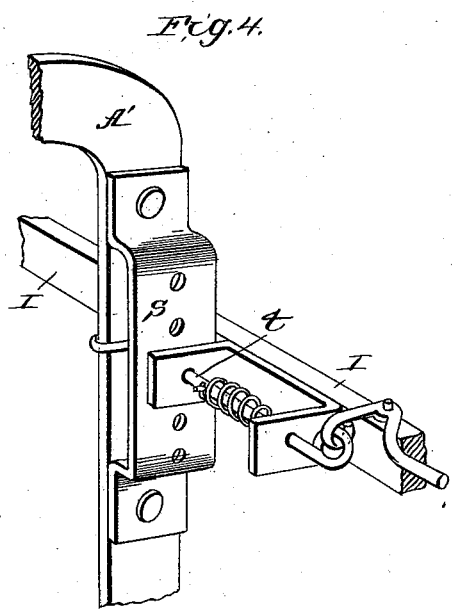
WITNESSES:
Fred G. Dieterich
Edw. W. Byrn.
INVENTOR.
Wm Quillen
Francis A. Dake
BY
Munn & Co
ATTORNEYS.

UNITED STATES PATENT OFFICE.

WILLIAM QUILLEN AND FRANCIS ALONZO DAKE, OF ALMENA, KANSAS.

CORN-PLOW.

SPECIFICATION forming part of Letters Patent No. 400,710, dated April 2, 1889.

Application filed December 28, 1888. Serial No. 294,397. (No model.)

*To all whom it may concern:*

Be it known that we, WILLIAM QUILLEN and FRANCIS ALONZO DAKE, of Almena, in the county of Norton and State of Kansas, have invented a new and useful Improvement in Corn-Plows, of which the following is a specification.

Our invention is in the nature of an improved plow for cultivating both sides of a row of corn or other plants at one passage of the plow; and it consists in the peculiar construction and arrangement of parts, which we will now proceed to describe.

Figure 1:
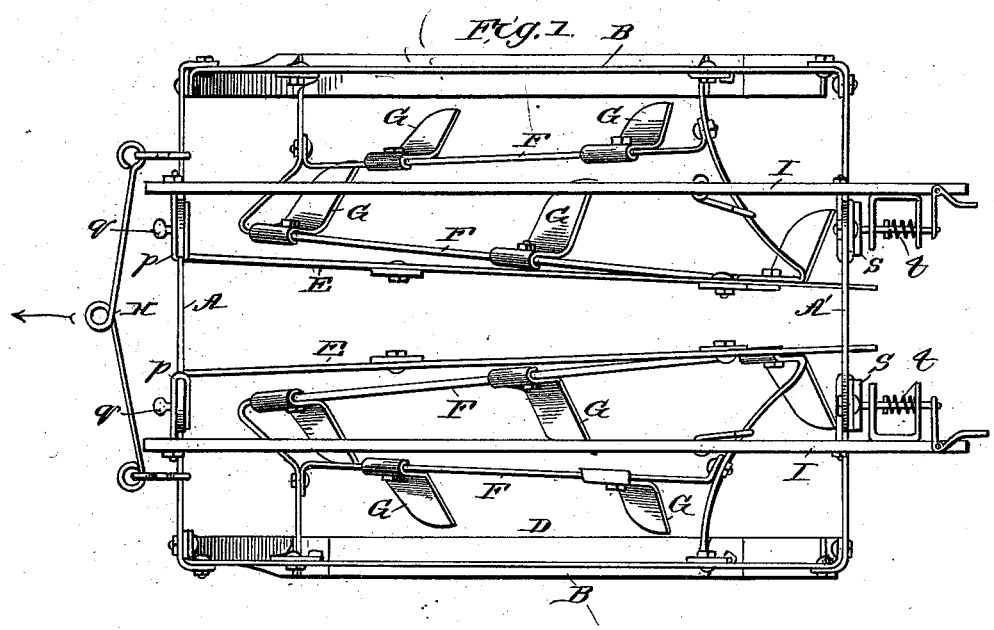
Figure 2:
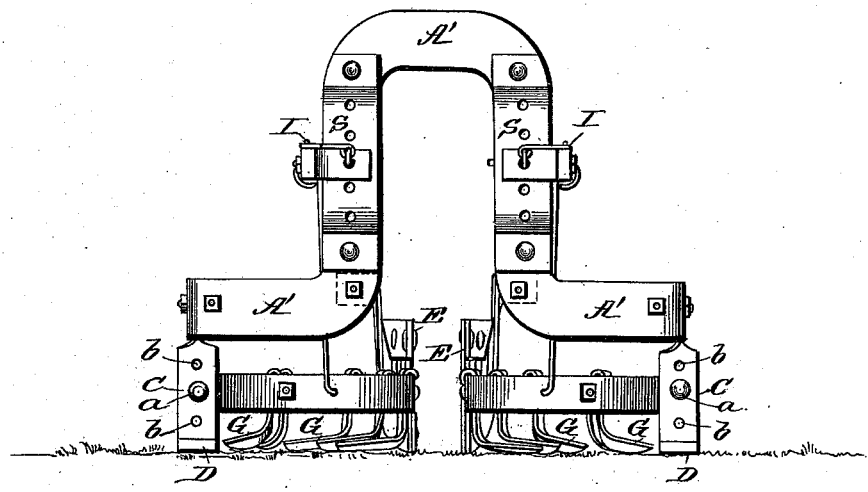

Figure 1 is a plan view; Fig. 2, a rear end elevation; Fig. 3, a side elevation, and Fig. 4 a perspective detail of the locking and adjusting device for the rear end of the handles.

A A' are two arched metal bars arranged at the front and back ends of the machine. The outer edges of these arched bars are connected by longitudinal metal bars B B, with braced corners, and these longitudinal side bars are supported by standards C C upon runner-bars D, which rest upon the ground and curve upwardly at their front ends like sled-runners. This frame is designed to be drawn over a row of corn or other plants, and the arched bars at the ends rise to a height sufficient to pass over the tops of the plants. On each side of the middle longitudinal line of the machine are arranged the cultivating devices. These consist of a blade, E, (see Fig. 1,) on each side, which are separated a distance from each other just far enough to permit the row of plants to pass between. These blades act as guards to protect the plants from the shovels, and said blades are at their front ends connected to the lower portion of the arch, and at their rear ends are connected to the cultivator-frames, which consist of two parallel bars, F F, bolted to the standards C C, and provided with curved cultivator blades or shovels G G, which at their lower ends are turned outwardly from the row of plants. These cultivator-frames are adjusted vertically by means of bolts *a*, Fig. 2, and a vertical series of holes, *b*, in standards C, and also a vertical series of holes in the rear upright bar of the guard-blades.

At the front end of the machine is a draft-bar, H, to which the team is hitched, and on each side of the machine is arranged a longitudinal handle, I.

All the frame-work of the plow except the handles is made of bar-iron one and one-half inch by one-half inch, bolted together, and the shovels or scrapers are made of two-and-one-half-inch steel.

The preferred dimensions of the plow are three feet eight inches wide by five feet long and two feet ten inches high to the top of the arches.

This plow will run steadily and stay in the ground and clean out all weeds and grass in the row, and will loosen up the dirt close to the corn.

If desired, one set of cultivators may be removed on each side of the machine to make a one-horse machine. I may also remove both sets of cultivators and use the frame as a sled for transporting articles.

The handles I are adjustably fastened to the front arch-bar by a plate, *p*, (see Fig. 1,) which embraces the arch-bar, and is provided with a set-screw, *q*, to clamp it to the arch-bar and regulate its height to suit different workmen. The handle is also guided over the rear arch-bar by a similar plate; but instead of a set-screw for adjusting it vertically there is a plate or strap, *s*, (see Fig. 4,) with a vertical series of holes attached to the rear side of the rear arch-bar, while a spring-bolt, *t*, on the handle is made to enter any one of these holes, and thus raise or lower the handles.

The object in raising and lowering the handles is to lift the shovels out of the ground or cause them to run deeper or shallower, as may be required. For this purpose the handles are each connected by a link-rod, *r*, Fig. 3, with the frame-work below that carries the shovels, so that the latter partake of the adjustment of the handles.

Having thus described our invention, what we claim as new is—

1. A plow or cultivator consisting of upwardly-arched end frames, A A', longitudinal side bars, B B, standards C C, runners D, arranged at the lower ends of the standards, the longitudinal guard-blades E E', the blades or shovels G, and the frames F F, placed between and connected to the standards and guard-blades, substantially as shown and described.

2. The combination, with the arched end frames, A A', of the two handles I I, connected thereto, the link-rods r, and the shovels, substantially as shown and described.

WILLIAM QUILLEN.
   FRANCIS ALONZO DAKE.

Witnesses:
 A. HULET,
 PRESTON ROBINSON.